(12) United States Patent
Wang et al.

(10) Patent No.: US 7,632,151 B2
(45) Date of Patent: Dec. 15, 2009

(54) CARD READER

(75) Inventors: Yung-Sheng Wang, San Chung (TW);
Yi-Chen Chen, Chu-Pei (TW);
Mei-Ling Hung, Hsinchu Hsien (TW);
Chu-Lin Chen, Taoyuan Hsien (TW)

(73) Assignees: Jinn Shyang Precision Industrial Co., Ltd., Taipei-Hsien (TW); Wander Plastic Ind. Company, Hsinchu Hsien (TW); Elmax Technology, Inc., Chu-Pei ( * ) Notice: Subject to any disclaimer, the term of this patent is extended or adjusted under 35 U.S.C. 154(b) by 60 days.

(21) Appl. No.: 11/984,458

(22) Filed: Nov. 19, 2007

(65) Prior Publication Data

US 2009/0130905 A1      May 21, 2009

(51) Int. Cl.
  *H01R 24/00*      (2006.01)
(52) U.S. Cl. .................... 439/630; 439/377; 439/607
(58) Field of Classification Search .......... 439/625, 439/630, 374, 377, 159
See application file for complete search history.

(56) References Cited

U.S. PATENT DOCUMENTS

| 5,944,559 | A  | * | 8/1999  | Wu .............................. 439/607 |
| 6,435,409 | B1 | * | 8/2002  | Hu .............................. 235/441 |
| 7,086,905 | B1 | * | 8/2006  | Chen ........................... 439/630 |
| 7,092,256 | B1 | * | 8/2006  | Salazar et al. ................ 361/737 |
| 7,179,129 | B1 | * | 2/2007  | Hwang ........................ 439/630 |
| D546,327  | S  | * | 7/2007  | Chen ........................... D14/356 |
| 2006/0223369 | A1 | * | 10/2006 | Zheng ......................... 439/607 |
| 2008/0108245 | A1 | * | 5/2008  | Chu et al. .................... 439/374 |

* cited by examiner

*Primary Examiner*—Tho D Ta
*Assistant Examiner*—Travis Chambers
(74) *Attorney, Agent, or Firm*—Brown & Thomas, PLLC

(57) ABSTRACT

A low profile card reader is disclosed to include a circuit board with a USB connection interface at the front part, an electrically insulative inner shell bonded to the circuit board outside the USB connection interface and defining an accommodation space, a card connector mounted in the accommodation space and electrically connected to the circuit board for receiving and reading a memory card and having a receiving space for receiving a memory card, a guide member connected to the circuit board and defining a sliding way disposed in line with the receiving space of the card connector for guiding a memory card into the card connector, and an outer metal shielding shell surrounding the circuit board, the electrically insulative inner shell, the card connector and the guide member for EMI protection with the USB connection interface of the circuit board exposed to the outside for connection to a computer.

11 Claims, 4 Drawing Sheets

CARD READER

BACKGROUND OF THE INVENTION

1. Field of the Invention

The present invention relates to card readers and more particularly, to a low profile, EMI (electromagnetic interference) protective card reader, which comprises a circuit board with a USB connection interface, an electrically insulative inner shell bonded to the circuit board and defining an accommodation space to accommodate a card connector, a guide member fastened to the circuit board for guiding a memory card into the card connector, and an outer metal shielding shell surrounding the circuit board, the electrically insulative inner shell, the card connector and the guide member for EMI protection.

2. Description of the Related Art

Following fast development of computer technology, innovative consumer electronic products are continuously created and digitalized. Modern digital electronic products, such as digital TVs, digital audio systems, MP3 players, digital cameras, electronic dictionaries, digital video cameras, PDAs and etc, commonly use a memory card for storing data and a memory card reader for reading storage data from the memory card. Further, following the market trend toward light, thin, short and small characteristics, the internal parts of an electronic product must be made relatively smaller to save the space. Therefore, mini memory cards are developed.

Commercial memory cards are numerous, including MMC (MultiMedia Card), CF (CompactFlash card), SMC (SmartMedia Card), MS (MemoryStick), SD (Secure Digital Memory Card), etc. There are also small-sized, high-capacity memory cards available on the market, such as Mini SD, MS Duo, Trans Flash (Micro SD), etc.

Further, a memory card reader is an interface between a memory card and a computer. By means of hot plug, a memory card reader is connectable to a USB port at a computer for enabling the computer to read data rapidly from a memory card that is inserted into the memory card reader. Commercial memory card readers commonly have a big size, not designed for insertion into a computer's USB port directly. For connecting a commercial memory card reader to a computer's USB port, an extra USB cable must be used. When many external peripheral apparatus are connected to a computer, the arrangement of the peripheral apparatus cables may bother the user.

Therefore, it is desirable to provide a low profile card reader that eliminates the aforesaid drawbacks.

SUMMARY OF THE INVENTION

The present invention has been accomplished under the circumstances in view. According to one aspect of the present invention, the card reader is comprised of a circuit board, an electrically insulative inner shell, a card connector, a guide member, and an outer metal shielding shell. The electrically insulative inner shell covers the front part of the circuit board to protect the USB connection interface of the circuit board against accidental impact during installation of the card reader in a computer or the like. The electrically insulative inner shell defines an accommodation space above the top surface of the circuit board for accommodating the card connector. The guide member is provided at the rear side of the circuit board to guide the inserted memory card into the card connector accurately. The outer metal shielding shell surrounds all the parts to protect the circuit board and the card connector against electromagnetic interference. After installation of the outer metal shielding shell, the card reader shows a low profile convenient for carrying.

According to another aspect of the present invention, the outer metal shielding shell shields the circuit board and the card connector, prohibiting electromagnetic interference during signal reading action of the card reader. Further, the outer metal shielding shell has grounding contacts kept in contact with respective metal grounding contacts of the circuit board to discharge electromagnetic noises and static electricity from the circuit board, preventing noise interference and improving signal reading stability and reliability. Further, the grounding contacts of the outer metal shielding shell impart an upward pressure to the circuit board to force the circuit board in direct contact with the outer metal shielding shell, preventing a short circuit.

According to another aspect of the present invention, the guide member guides the inserted memory card accurately into the receiving space of the card connector. Further, the guide member has a sliding way kept in line with the receiving space of the card connector for guiding the inserted memory card into the card connector, therefore the length of the card connector can be minimized. Further, when a memory card is set into position in the card connector, a light emitting device of the circuit board is electrically connected to emit light through the transparent (or translucent) guide member, giving a visual signal to indicate the current reading status of the card reader.

DETAILED DESCRIPTION OF THE PREFERRED EMBODIMENT

Figure 1:
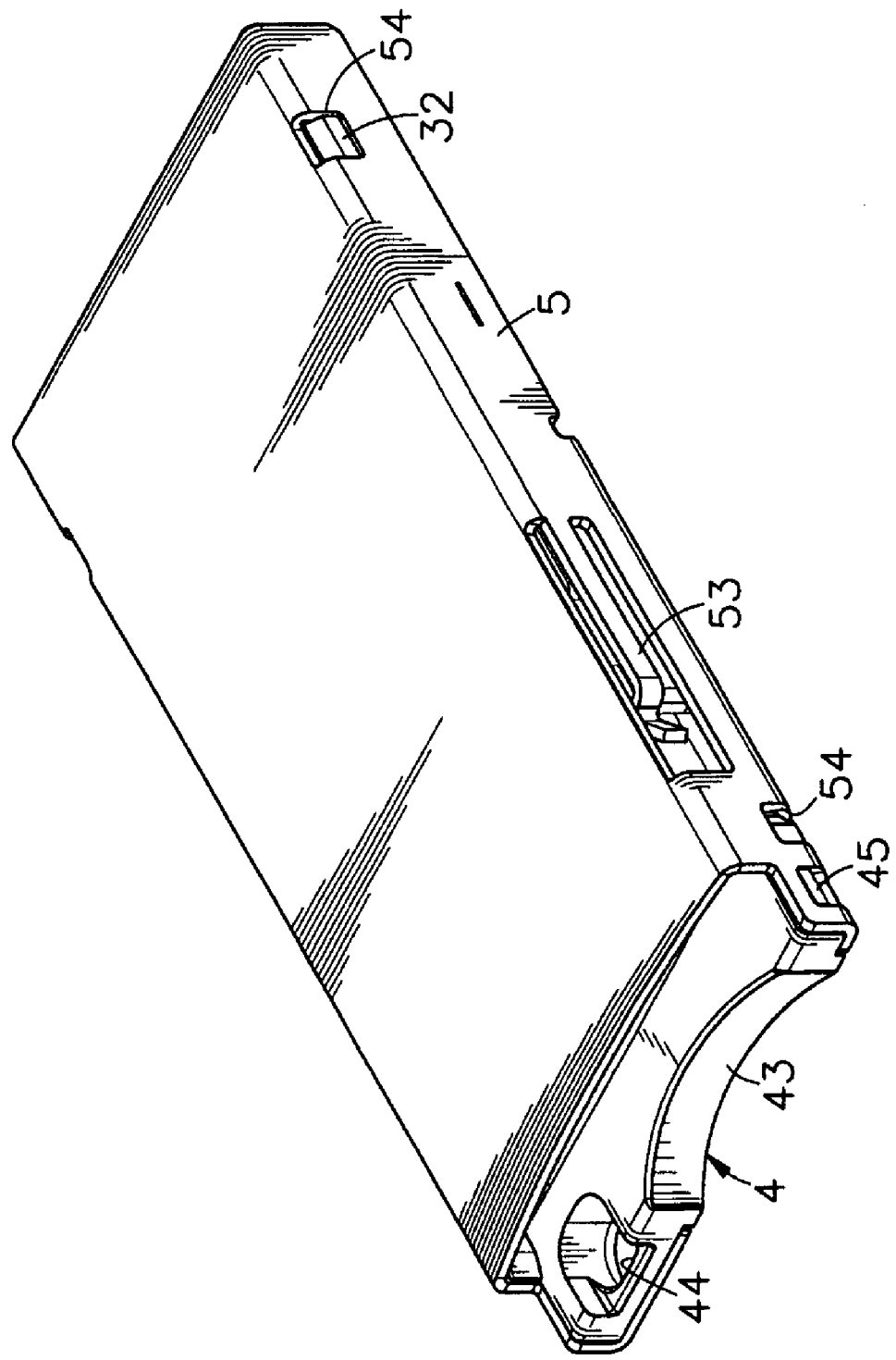
FIG. 1 is an oblique elevation of a card reader in accordance with the present invention.
Figure 2:
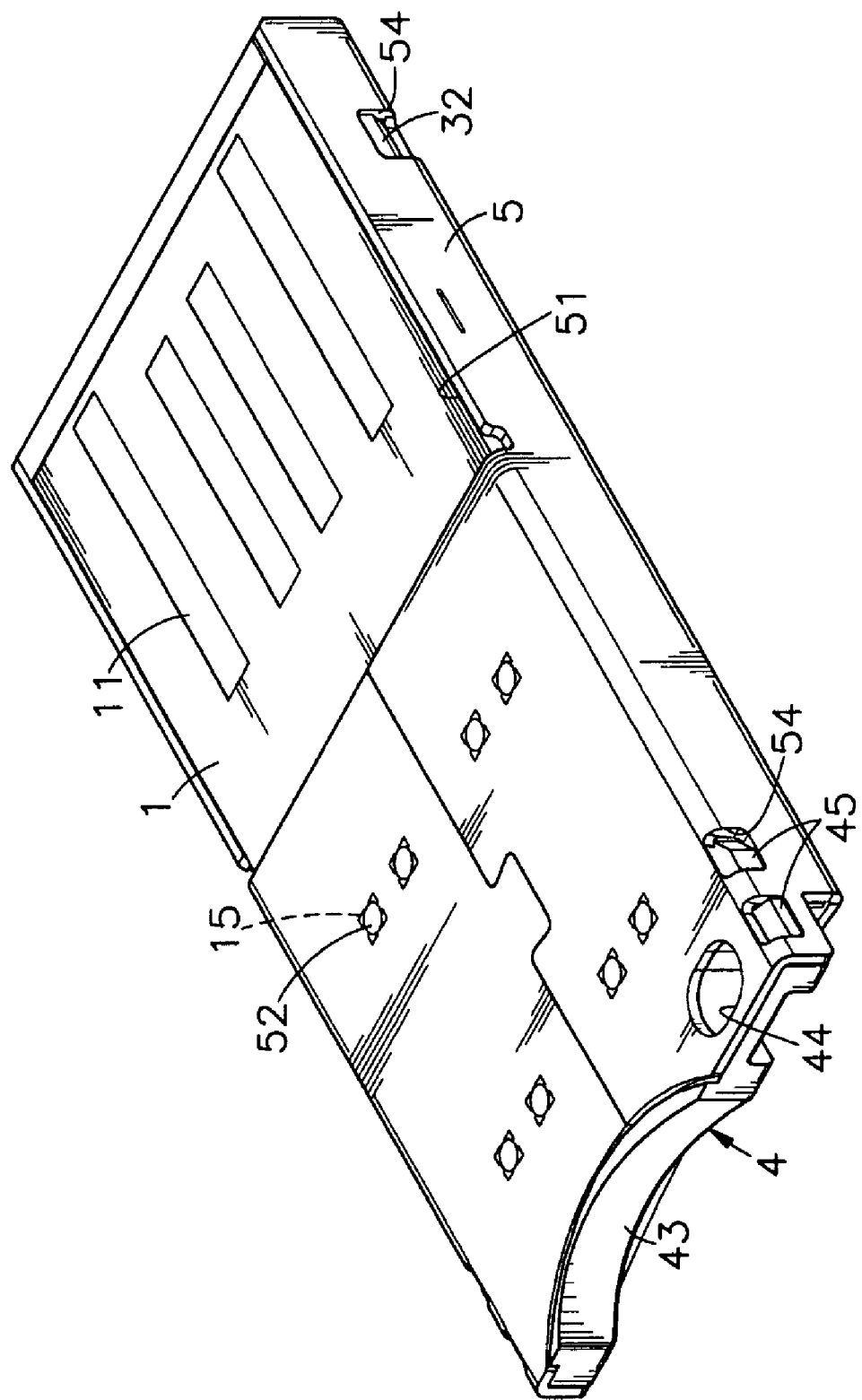
FIG. 2 is another oblique elevation of the card reader according to the present invention when viewed from another angle.
Figure 3:
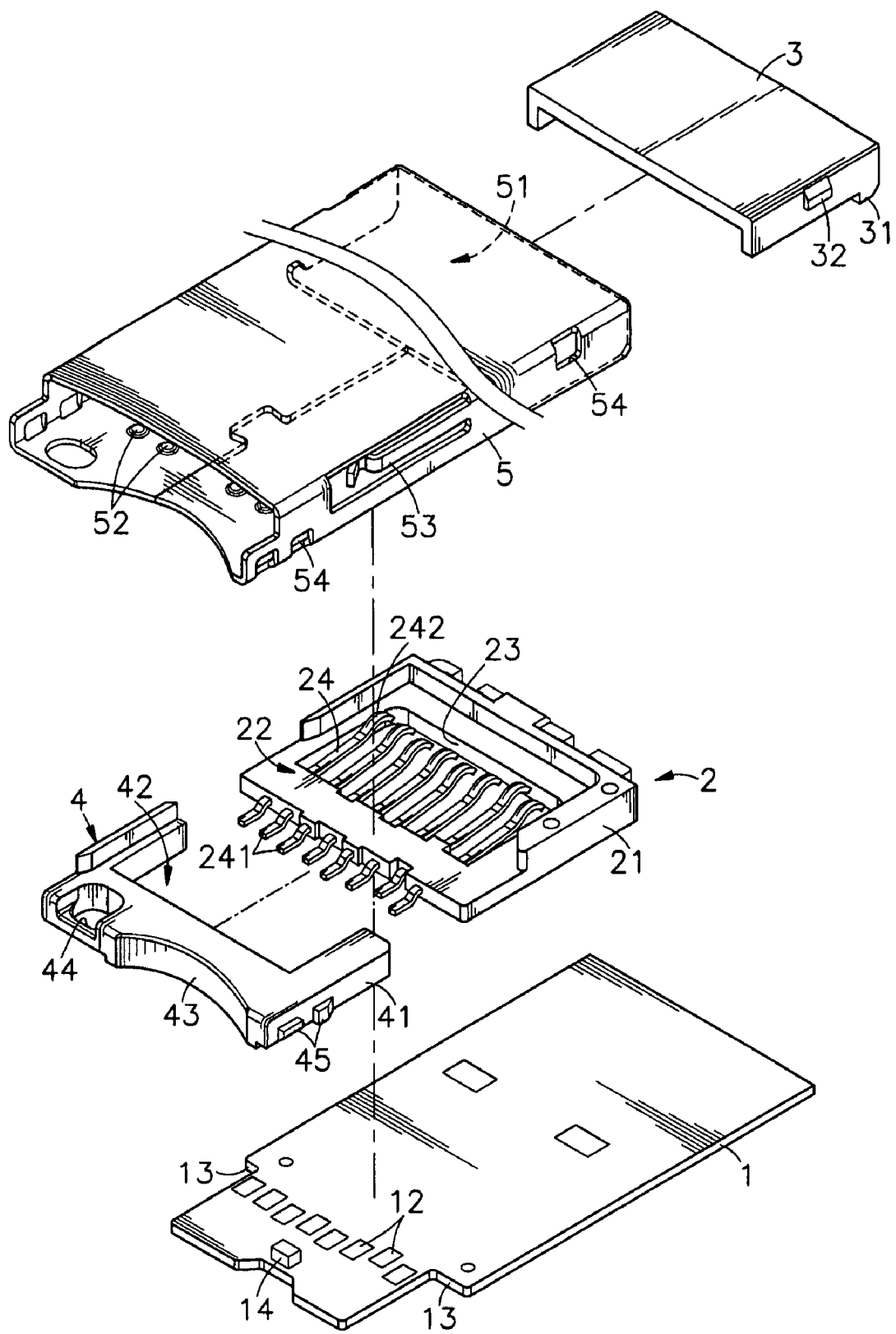
FIG. 3 is an exploded view of the card reader according to the present invention.
Figure 4:
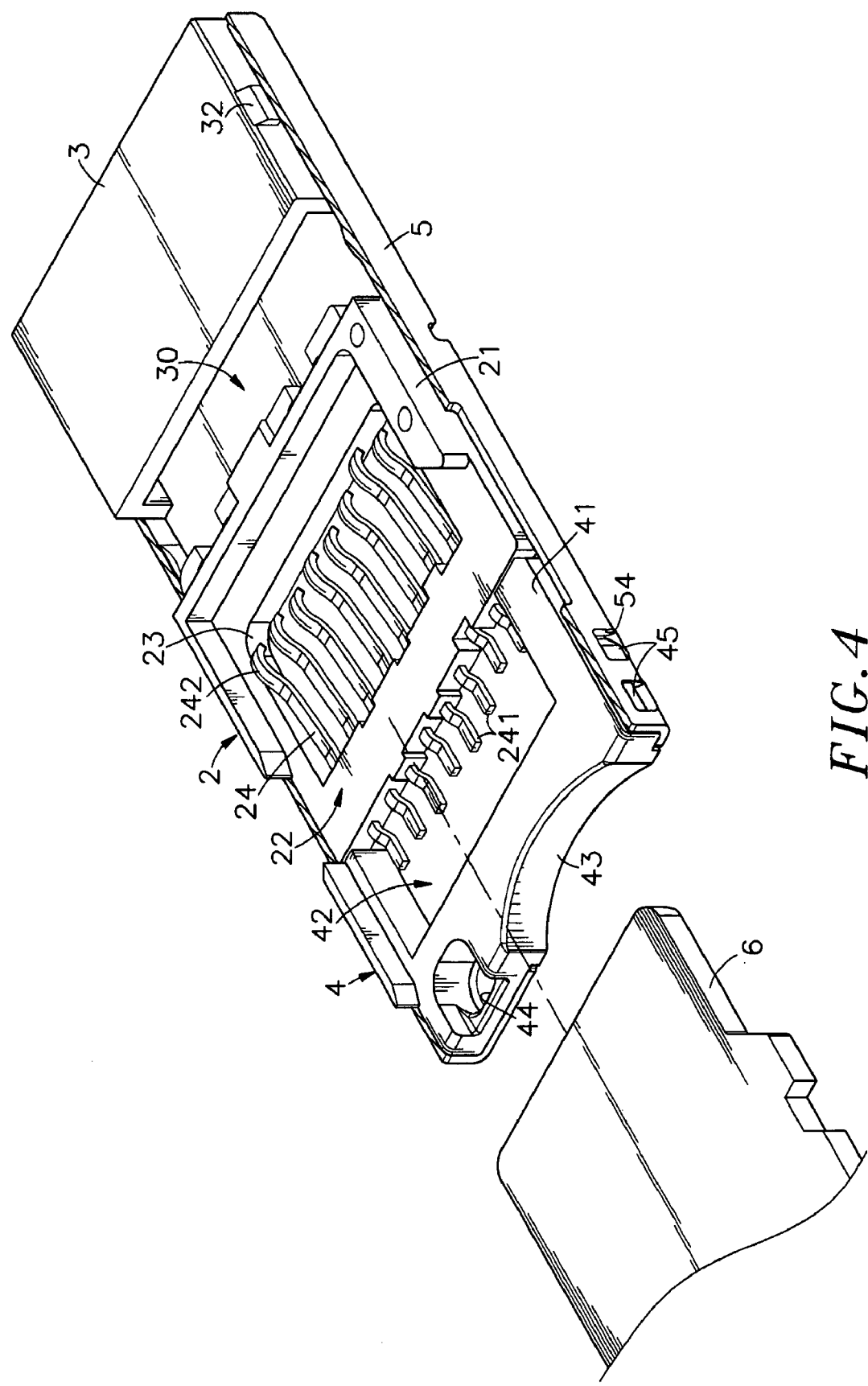
FIG. 4 is a cutaway view of the card reader according to the present invention.

Referring to FIGS. 1~4, a card reader in accordance with the present invention is shown comprised of a circuit board 1, a card connector 2, an electrically insulative inner shell 3, a guide member 4 and an outer metal shielding shell 5. The circuit board 1 comprises a USB connection interface 11. The electrically insulative inner shell 3 covers the front part of the circuit board 1, defining an accommodation space 30 above the top surface of the circuit board 1 for accommodating the card connector 2. The card connector 2 is electrically connected to the rear side of the circuit board 1. The guide member 4 is connected to one side of the card connector 2 for guiding a memory card into the card connector 2. The outer metal shielding shell 5 surrounds the circuit board 1, the card connector 2, the electrically insulative inner shell 3 and the guide member 4.

The circuit board 1 further comprises a plurality of metal bonding points 12 corresponding to the card connector 2, two coupling notches 13 disposed at two opposite lateral sides relative to the metal bonding points 12 for receiving the guide member 4, a light emitting device 14 provided on the middle between the two coupling notches 13, and a plurality of metal grounding contacts 15 near the USB connection interface 11.

The card connector 2 comprises a base 21, a receiving space 22 defined within the base 21 for receiving a memory card, a bottom opening 23, and a plurality of metal terminals 24 mounted in the base 21. Each metal terminal 24 has a bonding portion 241 at one end and a contact portion 242 at the other end.

The electrically insulative inner shell 3 covers the front part of the circuit board 1, having a receiving space 31 for receiving the circuit board 1 and two protruded retaining portions 32 symmetrically disposed at two opposite lateral sides.

The guide member 4 is made out of a transparent or translucent material, having two backwardly extending coupling arms 41 respectively coupled to the coupling notches 13 of the circuit board 1, a sliding way 42 defined at the top side corresponding to the receiving space 22 of the card connector 2 for guiding a memory card into the receiving space 22, a front recess 43, a front through hole 44 at one side of the front recess 43, and a plurality of protruded retaining portions 45 symmetrically disposed at the two opposite lateral sides.

The outer metal shielding shell 5 comprises an opening 51 corresponding to the USB connection interface 11 of the circuit board 1, a plurality of protruded grounding contacts 52 on the inside corresponding to the metal grounding contacts 15 of the circuit board 1, one spring arm 53 disposed at the lateral side, and a plurality of retaining holes 54 symmetrically disposed at the two opposite lateral sides corresponding to the protruded retaining portions 32 of the electrically insulative inner shell 3 and the protruded retaining portions 45 of the guide member 4.

The assembly process of the card reader is simple and outlined hereinafter. The card connector 2 is positioned on the circuit board 1 to have the bonding portions 241 of the metal terminals 24 of the card connector 2 be respectively soldered to the metal bonding points 12 of the circuit board 1, and then the circuit board 1 is positioned in the receiving space 31 inside the electrically insulative inner shell 3, and then the guide member 4 is fastened to the circuit board 1 by coupling the backwardly extending coupling arms 41 of the guide member 4 to the coupling notches 13 of the circuit board 1, and then the outer metal shielding shell 5 is wrapped about the circuit board 1, the card connector 2, the electrically insulative inner shell 3 and the guide member 4 to have the USB connection interface 11 of the circuit board 1 be exposed to the opening 51 of the outer metal shielding shell 5, the metal grounding contacts 15 of the circuit board 1 be kept in contact with the protruded grounding contacts 52 of the outer metal shielding shell 5, the spring arm 53 of the outer metal shielding shell 5 suspend in the sliding way 42 of the guide member 4 at the lateral side, and the retaining holes 54 of the outer metal shielding shell 5 be forced into engagement with the protruded retaining portions 32 of the electrically insulative inner shell 3 and the protruded retaining portions 45 of the guide member 4. Thereafter, a waterproof bonding glue is filled in a gap between the outer metal shielding shell 5 and the electrically insulative inner shell 3, thereby finishing the assembly.

When inserting a memory card 6 into the card reader, the memory card 6 is inserted through the sliding way 42 in the guide member 4 into the receiving space 22 of the card connector 2 to contact the contact portions 242 of the metal terminals 24 of the card connector 2 electrically and to force the contact portions 242 of the metal terminals 2 downwards in the bottom opening 23. When the memory card 6 is set into position, the spring arm 53 of the outer metal shielding shell 5 holds down the memory card 6 in positive contact with the contact portions 242 of the metal terminals 24 of the card connector 2. By means of the USB connection interface 11 of the circuit board 1, the card reader can be electrically connected to an USB socket in a computer to electrically connect the memory card 6 to the computer through the card connector 2 and the USB connection interface 11 of the circuit board 1.

As stated above, the guide member 4 is made out of a transparent (or translucent) material. When the memory card 6 is set into position in the card reader, the light emitting device 14 of the circuit board 1 is electrically connected to emit light through the guide members 4, giving a visual signal. Further, the design of the front recess 43 facilitates removal of the inserted memory card 6 from the card reader by a user. Further, the front through hole 44 is provided for the insertion of a wire member to secure a key ring or ornamental member to the card reader.

In general, the invention provides a card reader, which has the following features and benefits:

1. The electrically insulative inner shell 3 covers the front part of the circuit board 1 to protect the USB connection interface 11 of the circuit board 1 against accidental impact during installation of the card reader in a computer or the like; defining an accommodation space 30 above the top surface of the circuit board 1 for accommodating the card connector 2; the guide member 4 is provided at the rear side of the circuit board 1 to guide the inserted memory card 6 into the card connector 2 accurately; when all the parts are wrapped by the outer metal shielding shell 5, the card reader has a low profile convenient for carrying.

2. The outer metal shielding shell 5 well shields the circuit board 1 and the card connector 2, prohibiting electromagnetic interference during signal reading action of the card reader 2; the grounding contacts 52 of the outer metal shielding shell 5 are kept in contact with the metal grounding contacts 15 of the circuit board 1 to discharge electromagnetic noises and static electricity from the circuit board 1, preventing noise interference and improving signal reading stability and reliability; the grounding contacts 52 of the outer metal shielding shell 5 also impart an upward pressure to the circuit board 1 to force the circuit board 1 in direct contact with the outer metal shielding shell 5, preventing a short circuit.

3. The guide member 4 guides the inserted memory card 6 accurately into the receiving space 22 of the card connector 2; because the guide member 4 has its sliding way 42 kept in line with the receiving space 22, the length of the base 21 of the card connector 2 can be minimized; when the memory card 6 is set into position in the card connector 2, the light emitting device 14 of the circuit board 1 is electrically connected to emit light through the transparent (translucent) guide member 4, giving a visual signal to indicate the current reading status.

A prototype of card reader has been constructed with the features of FIGS. 1~4. The card reader functions smoothly to provide all of the features discussed earlier.

Although particular embodiments of the invention have been described in detail for purposes of illustration, various modifications and enhancements may be made without departing from the spirit and scope of the invention. Accordingly, the invention is not to be limited except as by the appended claims.

What the invention claimed is:

1. A card reader comprising:
   a circuit board, said circuit board comprising a USB connection interface at a front part thereof;
   an electrically insulative inner shell bonded to the front part of said circuit board outside said USB connection interface and defining with a top wall of said circuit board an accommodation space;
   a card connector mounted in said accommodation space and electrically connected to said circuit board for receiving and reading a memory card, said card connector comprising a base and a receiving space defined within said base for receiving a memory card;

a guide member connected to a rear part of said circuit board, said guide member defining a sliding way disposed in line with said receiving space of said card connector for guiding a memory card into said receiving space of said card connector; and an outer metal shielding shell surrounding said circuit board, said electrically insulative inner shell, said card connector and said guide member outside said accommodation space, said outer metal shielding shell having an opening corresponding to the USB connection interface of said circuit board wherein said guide member comprises a plurality of protruding retaining portions symmetrically disposed at two opposite lateral sides thereof; said outer metal shielding shell comprises a plurality of retaining holes respectively fastened to said protruding retaining portions of said guide member.

2. The card reader as claimed in claim 1, wherein said circuit board comprises a plurality of metal bonding points; said card connector comprises a plurality of metal terminals respectively electrically bonded to said metal bonding points of said circuit board.

3. The card reader as claimed in claim 1, wherein said circuit board has two coupling notches disposed at two sides of the rear part thereof; said guide member comprises two backwardly extending coupling arms respectively coupled to said coupling notches of said circuit board.

4. The card reader as claimed in claim 1, wherein said guide member is made out of a transparent material; said circuit board comprises light emitting means adapted to emit light when a memory card is inserted into said receiving space of said card connector.

5. The card reader as claimed in claim 1, wherein said guide member is made out of a translucent material; said circuit board comprises light emitting means adapted to emit light when a memory card is inserted into said receiving space of said card connector.

6. The card reader as claimed in claim 1, wherein said circuit board comprises a plurality of metal grounding contacts; said outer metal shielding shell comprises a plurality of grounding contacts protruding from an inside wall thereof and disposed in contact with said metal grounding contacts of said circuit board.

7. The card reader as claimed in claim 1, wherein said base of said card connector has a bottom opening in communication with said receiving space; said card connector comprises a plurality of metal terminals suspending in said bottom opening; said outer metal shielding shell covers said card connector above said receiving space.

8. The card reader as claimed in claim 1, wherein electrically insulative inner shell comprises a receiving space, which receives said circuit board, and a plurality of protruding retaining portions symmetrically disposed at two opposite lateral sides thereof; said outer metal shielding shell comprises a plurality of retaining holes respectively fastened to said protruding retaining portions of said electrically insulative inner shell.

9. The card reader as claimed in claim 1, wherein said outer metal shielding shell comprises one spring arm disposed at a lateral side thereof for holding down a memory card in said card connector.

10. The card reader as claimed in claim 1, wherein said guide member further includes a front recess and a front through hole at one side of the front recess.

11. A card reader comprising:

a circuit board, said circuit board comprising a USB connection interface at a front part thereof;

an electrically insulative inner shell bonded to the front part of said circuit board outside said USB connection interface and defining with a top wall of said circuit board an accommodation space;

a card connector mounted in said accommodation space and electrically connected to said circuit board for receiving and reading a memory card, said card connector comprising a base and a receiving space defined within said base for receiving a memory card;

a guide member connected to a rear part of said circuit board, said guide member defining a sliding way disposed in line with said receiving space of said card connector for guiding a memory card into said receiving space of said card connector; and an outer metal shielding shell surrounding said circuit board, said electrically insulative inner shell, said card connector and said guide member outside said accommodation space, said outer metal shielding shell having an opening corresponding to the USB connection interface of said circuit board wherein said circuit board comprises a plurality of metal grounding contacts; said outer metal shielding shell comprises a plurality of grounding contacts protruding from an inside wall thereof and disposed in contact with said metal grounding contacts of said circuit board.

\* \* \* \* \*